(12) United States Patent
Altmejd (10) Patent No.: US 7,143,203 B1
(45) Date of Patent: Nov. 28, 2006

(54) STORAGE DEVICE CONTROL RESPONSIVE TO OPERATIONAL CHARACTERISTICS OF A SYSTEM

(75) Inventor: Morrie Altmejd, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 579 days.

(21) Appl. No.: 10/132,913

(22) Filed: Apr. 26, 2002

(51) Int. Cl.
*G06F 3/00* (2006.01)

(52) U.S. Cl. .................. 710/16; 710/15; 710/18; 710/19; 713/300; 713/322; 713/323; 713/324; 713/325; 713/340

(58) Field of Classification Search ............ 710/15, 710/16, 18, 19; 711/156, 163, 167; 713/300, 713/320, 322–324
See application file for complete search history.

(56) References Cited

U.S. PATENT DOCUMENTS

| | | | | |
|---|---|---|---|---|
| 5,481,733 A | * | 1/1996 | Douglis et al. | 713/324 |
| 5,517,649 A | * | 5/1996 | McLean | 713/323 |
| 5,535,400 A | * | 7/1996 | Belmont | 713/330 |
| 5,787,292 A | * | 7/1998 | Ottesen et al. | 713/300 |
| 5,900,007 A | * | 5/1999 | Nunnelley et al. | 711/4 |
| 5,954,820 A | * | 9/1999 | Hetzler | 713/323 |
| 5,961,613 A | * | 10/1999 | DeNicola | 710/18 |
| 6,115,823 A | * | 9/2000 | Velasco et al. | 713/322 |
| 6,476,994 B1 | * | 11/2002 | Koizumi et al. | 360/69 |
| 6,622,252 B1 | * | 9/2003 | Klaassen et al. | 713/320 |
| 6,654,896 B1 | * | 11/2003 | Saunders et al. | 713/323 |
| 6,795,927 B1 | * | 9/2004 | Altmejd et al. | 713/300 |

OTHER PUBLICATIONS

Derwent-Acc-No. 1999-477809, Patent Assignee: Int Business Machines Corp [IBMC], Title: Method for operation prediction in three and half inch hard disk drive (HDD) power save mode providing advantage for green persoanl computer (PC).*

* cited by examiner

*Primary Examiner*—Fritz Fleming
*Assistant Examiner*—Niketa I. Patel
(74) *Attorney, Agent, or Firm*—Zagorin O'Brien Graham LLP (57) ABSTRACT

It has been discovered that system operational characteristics (e.g., power level, clock frequency, processor utilization, operating system time slice utilization, size and age of queued jobs) may be used to predict storage access requirements for the system. By predicting the storage access requirements of a system, a storage subsystem may be advantageously controlled to anticipate storage accesses. A storage device or array of such devices can be configured to operate, for example, at selected speeds no greater than that required to process the predicted storage access requirements. The storage access prediction may be based, for example, on the frequency and voltage at which a processor is running or based on other system performance indicators such as job backlog and age and size thereof. Various controllable characteristics such as the speed of a hard drive's storage media, the current applied to a read/write head, etc., can be increased or decreased continuously or to discrete values in response to moving average indicators which provide advance warning of potential processing, and therefore potential storage access, swings.

43 Claims, 3 Drawing Sheets

STORAGE DEVICE CONTROL RESPONSIVE TO OPERATIONAL CHARACTERISTICS OF A SYSTEM

BACKGROUND

1. Field of the Invention

The present invention relates to storage device control and, more particularly, to such control based on system operation information.

2. Description of the Related Art

Information processing systems such as computer systems typically include storage devices such as hard drives or other computer readable media. The efficiency and speed of hard drives, for example, often play a significant role in the overall performance of the system. While it is advantageous to the information processing speed of the system for a hard drive to operate at a peak state (e.g., rotating at a maximum speed), such a peak state often wastes energy and increases unnecessary noise. While turning off a hard drive eliminates energy waste and noise generation, the significant ramp times from a sleep state to a maximum speed for reading the hard drive can cause a significant increase in the overall data access time, waste energy for low priority or short drive accesses and cause unnecessary heat and noise generation.

In a typical system, when the performance of processing devices is increased, the storage devices operate at a maximum speed. Actual storage access events can be used to determine if a storage device should be on or off/asleep, but such implementations cannot predict what the system storage access requirements are likely to be, since they have no knowledge of the performance of system processing devices or other system operational characteristics. Accordingly, a means of predicting storage access requirements and a flexible means of advantageously controlling storage devices in view thereof is desirable.

SUMMARY

It has been discovered that system operational characteristics (e.g., power level, clock frequency, processor utilization, operating system time slice utilization, size and age of queued jobs) may be used to predict storage access requirements for the system. By predicting the storage access requirements of a system, a storage subsystem may be advantageously controlled to anticipate actual storage accesses. Historical information processing platform (IPP) operational characteristics may be used in place of or in addition to the use of a contemporaneous, non-IPP characteristic such as the existence of an immediately pending storage access request.

For example, software can be used to predict storage access requirements based on an average IPP performance state over a period of time. A storage device or array of such devices can be configured to operate, for example, at selected speeds no greater than that required to process the predicted storage access requirements. The storage access prediction may be based, for example, on the frequency and voltage at which the CPU of an IPP is running or based on other system performance indicators such as job backlog and age and size thereof. Various controllable characteristics such as the speed of a hard drive's storage media, the current applied to a read/write head, etc., can be increased or decreased continuously or to discrete values in response to the moving average indicators which provide advance warning of potential processing, and therefore potential storage access, swings. In this example, sudden toggling of a hard drive between a maximum access speed and a sleep state can be avoided using the software and method described herein.

A method of operating a storage device coupled to an information processing system is provided. In one embodiment, the method includes the step of controlling a controllable characteristic of the storage device in a manner dependent at least in part on an operational characteristic of the information processing system. In another embodiment, the method includes the step of monitoring an operational characteristic of the information processing system, and the step of predicting a device access requirement dependent at least in part upon the operational characteristic of the information processing system.

In another embodiment, an information processing system includes a processing platform, a storage platform, and a storage controller. The storage controller is coupled to receive information regarding an operational characteristic of the processing platform after execution of the storage controller is initiated. The storage platform is coupled to the processing platform and is coupled to receive control information from the storage controller after execution of the storage controller is initiated.

In another embodiment, an apparatus includes at least one computer readable medium with encoded information on the at least one computer readable medium. The apparatus includes encoded information for monitoring an operational characteristic of a system, and encoded information for generating storage control information dependent upon the operational characteristic of the system.

Of course, the foregoing is a summary and thus may contain, often by necessity, simplifications, generalizations and omissions of detail. Consequently, those skilled in the art will appreciate that the foregoing summary is illustrative only and that it is not intended to be in any way limiting of the invention. Other aspects, inventive features, and advantages of the present invention, which is defined solely by the claims, may become apparent from the description set forth below.

BRIEF DESCRIPTION OF THE DRAWINGS

The present invention may be better understood, and its numerous objects, features, and advantages made apparent to those skilled in the art, by referencing the accompanying drawings. The use of the same reference symbols in different drawings indicates similar or identical items.

DESCRIPTION OF THE PREFERRED EMBODIMENT(S)

The above referenced figures and the following discussion are intended to provide details of at least one example of the invention and should not be taken to be limiting of the invention itself. Rather, any number of variations may fall within the scope of the invention which is properly defined in the claims following this description.

Figure 1:
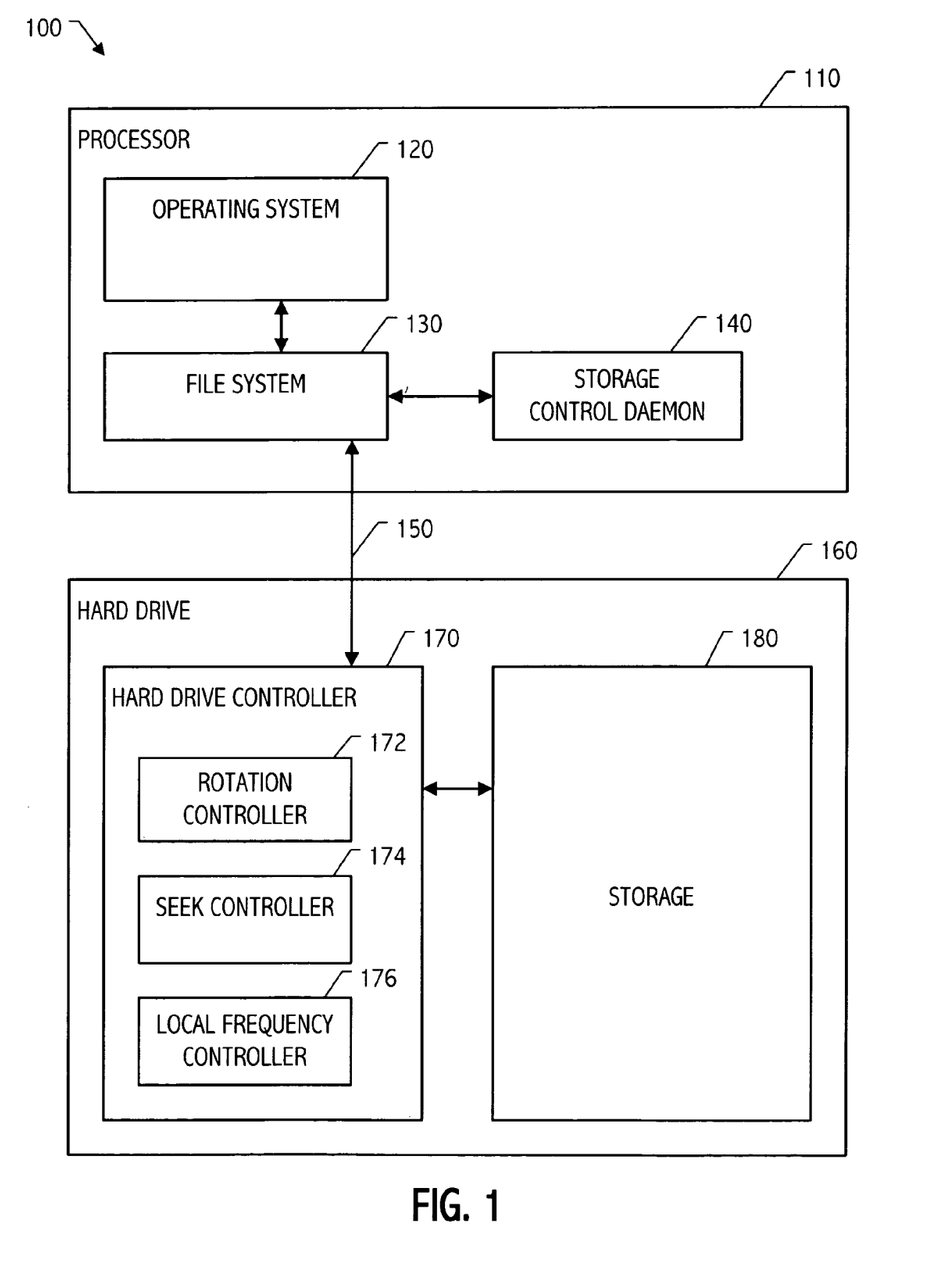
FIG. 1 is a block diagram of an information processing system including a storage control subsystem.

FIG. 1 shows an information processing system 100 including components for monitoring system performance characteristics and controlling storage elements responsive thereto. System 100 is any type of information processing system such as a computer system (e.g., portable, workstation or other type of computer system). System 100 includes an information processing platform such as processor 110, and an information storage platform such as hard drive 160. Processor 110 is coupled to hard drive 160 via bus 150. System 100 may include many other elements in various other configurations which are not shown so to avoid obfuscation of the invention.

Processor 110 includes operating system 130, file system 130 and storage control daemon 140. Operating system 120 is coupled to file system 130, which in turn is coupled to storage control daemon 140. Operating system 120, file system 130 and storage control daemon 140 operate within the context of processor 110, either within the hardware of processor 110 as shown, or within hardware coupled to processor 110 within an overall information processing platform of system 100. Storage control daemon 140 may be provided as an integral part of operating system 120 or as a separate software or firmware module.

Processor 110 is capable of operation at more than one frequency and at more than one power level. The frequency and power level may be tuned "on the fly" during operation of processor 110, typically using a temporary halt of processor 110, followed by a switch in frequency and/or power level, followed by a resumption of processing. This capability is useful for addressing efficiency and power savings considerations.

Storage control daemon 140 is a program that runs continuously and in the background of other running programs or processes. In other embodiments, storage control daemon 140 includes computer processes which may or may not execute continuously or in the background of other programs or processes executing on processor 110.

Storage control daemon 140 monitors the operation of all or portions of system 100 (e.g., processor 110), makes storage access predictions based on such observations, and forwards control information to other programs or processes as appropriate based on such predictions. Storage control daemon 140 provides such control information to hard drive 160 to affect control of certain controllable characteristics of hard drive 160.

For example, storage control daemon 140 monitors the power level of processor 110 in order to predict storage access requirements of hard drive 160. In one such embodiment, processor 110 is coupled to provide a digital voltage identification signal to a digital-to-analog converter (DAC) via a digital control bus (not shown). The digital signal is determined at least in part by system/processor performance information. For example, if processor 110 is being underutilized (e.g., with a number of unused processor cycles), the DAC provides a corresponding analog control signal to a power supply (not shown) of the system. The power supply is coupled to provide a controlled power supply signal to processor 110 and various other components of system 100 to control the level of power received such components to save power or otherwise maximize efficiency. The level of power supplied to processor 110 may be used as a predictive indicator of storage access requirements by storage control daemon 140.

Alternatively, or in addition, processor 110 may also include or be coupled to a module (hardware or otherwise) which controls the frequency of processor 110 to maximize efficiency, speed and/or power conservation. In some cases, frequency is reduced to save power when processor 110 is not being fully utilized. Frequency is increased to maximize information processing speed when a great number of instructions must be executed. In such cases, storage control daemon 140 may use the frequency level to predict storage access requirements of hard drive 160.

File system 130 includes and/or provides information regarding utilization of processor 110 which may be used by storage control daemon 140 to determine the likelihood of storage access requests. The presence, absence or number of active or pending storage access requests may also be monitored to make predictions to generate control information to control certain characteristics of hard drive 160. For example, file system 130 may include a list of pending file transfer jobs, job lengths/sizes, age of each job, etc. This information may be received by storage control daemon 140 and used to predict the extent of future storage access requirements. For example, the sum, for all tasks, of each task waiting time for a pending input/output (I/O) transfer multiplied by the size of the corresponding pending I/O transfer.

Hard drive 160 includes storage 180 for storing information for use within system 100. Storage 180 commonly, but not necessarily, includes a rotatable storage medium and a read/write or I/O head for accessing (e.g., reading and/or writing) the rotatable storage medium of storage 180. Hard drive 160 also includes hard drive controller 170 for controlling the access of storage 180. Hard drive controller 170 is coupled to storage 180 and to file system 130. In alternative embodiments, storage 180 may be coupled directly to file system 130 or other elements of processor 110.

Hard drive controller 170 may be envisioned as a microcontroller or a software or firmware module operating on a microcontroller, depending on the context. Hard drive controller 170 controls storage access requests from the information processing platform (e.g., processor 110) of system 100 to facilitate the transfer of information to and from storage 180 and processor 110 and, potentially, various processing elements associated with processor 110.

Hard drive controller 170 also controls certain physical aspects of the hard drive 160 responsive to communications from storage control daemon 140. Control of certain characteristics of the hard drive may be useful to minimize noise, heat and waste while still balancing such conditions against performance requirements of the hard drive. Also, as shown herein, hard drive 160 may be controlled by storage control daemon 140 and hard drive controller 170 using predictions based on operational characteristics of elements of system 100 such as the current and past usage of processor 110, frequency and power of processor 110, and storage access job queue status. This allows enhanced efficiency of operation due to the predictive component of such control.

Hard drive controller 170 includes various subcontrollers for controlling various controllable characteristics of controller 170. Some exemplary controllable characteristics are the rotational speed of the storage medium, the seek/settle speed of the I/O head, and the local frequency of the clocks of a local microcontroller on hard drive 160. Hard drive controller 170 includes rotation controller 172 to control the rotational speed of storage 180. Hard drive controller 170 includes seek controller 174 to control the seek speed of the I/O head. Hard drive controller 170 includes local frequency controller 176 to control the frequency of the local microprocessor clocks of hard drive controller 170.

Storage 180 may also include a storage control module (not shown) in the form of a software module stored for execution by processor 110 in order to initiate operation of storage control daemon 140. The storage control module may be a stand alone module or a submodule of a power control module or some other software module. The storage control module initiates operation of a storage control daemon "in" processor 110. The operation of system 100 under the influence of the storage control module and storage control daemon 140 is described herein and with reference to FIGS. 2–3.

Figure 2:
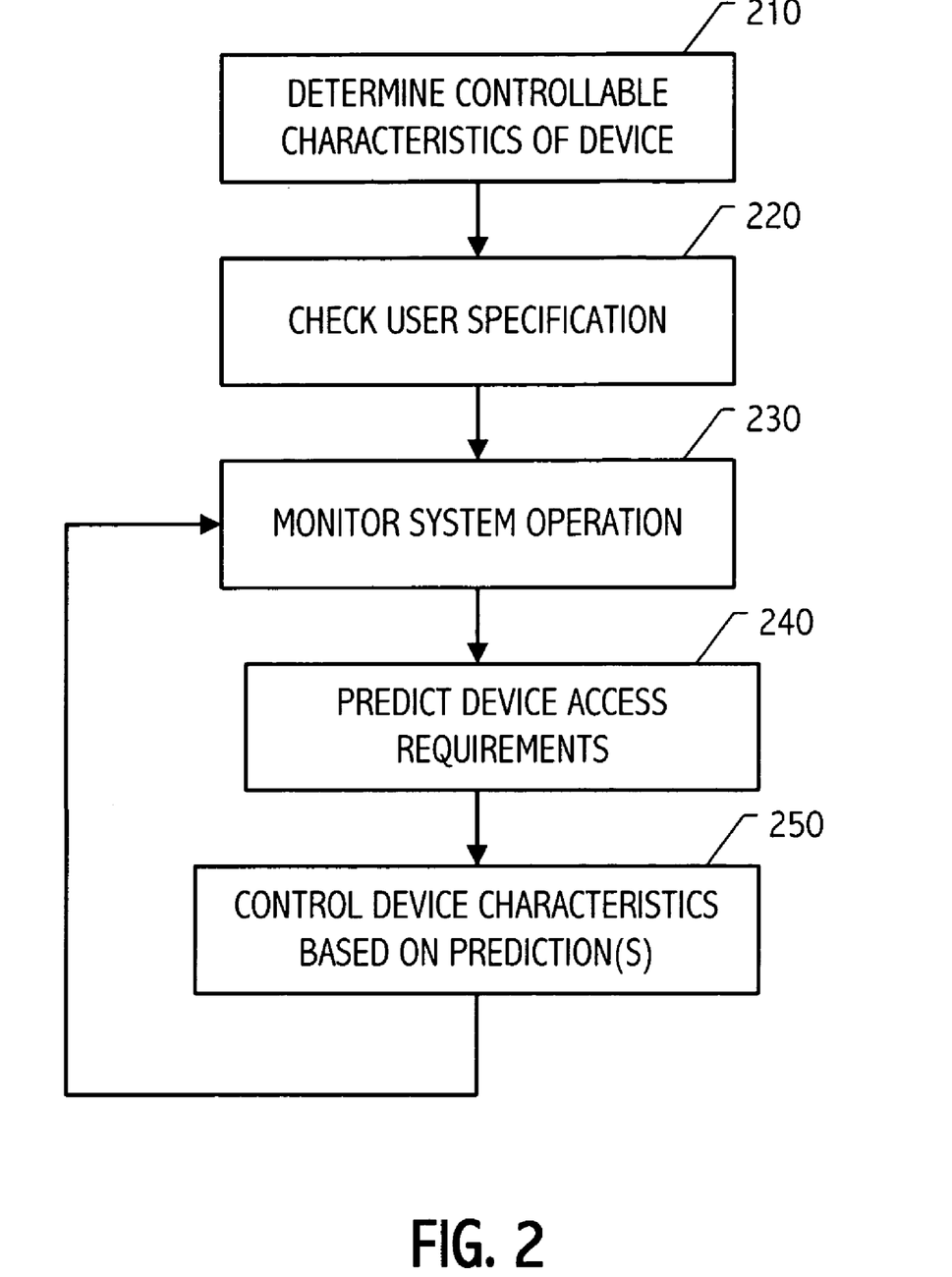
FIG. 2 is a flowchart showing exemplary storage control operations.

FIG. 2 shows an operational flow of various modules operating within the context of system 100. Generally, these modules (e.g., storage control daemon 140) operate to determine controllable characteristics (e.g., speed, frequency, power, queue status) of devices (e.g., an information storage platform such as a hard drive) coupled to an information processing platform. For example, the storage control daemon 140 operate to determine the whether the speed, frequency and power characteristics of an information storage platform such as hard drive 160 are controllable. The status of certain system operational characteristics of system 100 such as processor frequency, processor power, OS time slice usage and job queue status may then be monitored. These operational characteristics are monitored in view of certain user-programmable requirements. Device access requirements (e.g., for the information storage platform) are predicted, and the controllable characteristics of the devices are controlled based on the predictions.

For example, at determine controllable characteristics step 210, a control module determines whether devices coupled to an information processing platform have any controllable characteristics, and if so, what those characteristics are. Within the context of exemplary system 100, storage control daemon 140 can query hard drive 160 to request it to enumerate its performance states so that storage control daemon can determine which characteristics of hard drive 160 are controllable and what form control information should take when it is sent to hard drive 160 to control those characteristics.

For example, storage control daemon 140 may determine whether a rotational storage element of storage 180 is controllable to variable rotational speeds, what maximum, intermediate and minimum speeds may be applicable, and whether storage 180 is fast or sluggish by retrieving indications of change times between speeds. Storage control daemon 140 may also determine whether hard drive 160 includes a read/write head which has a controllable seek speed (e.g., to aid in conservation of current). Storage control daemon 140 may also determine whether local hard drive controller 170 of hard drive 160 includes a variable frequency or power level. Other elements of hard drive 160 may be controllable, for example, to allow greater power savings and/or efficiency of operation of hard drive 160. Other elements that may be fine tunable include certain detector characteristics, such as detector thresholds and detector timing characteristics for detecting information stored on storage 180, along with characteristics of filters and amplifiers and other elements of the read/write circuitry of hard drive 160.

After determining controllable characteristics during step 210, storage control daemon 140 checks a user specification during step 220 to determine if the user of system 100 has programmed specific performance requirements and/or power saving requirements for devices within system 100. For example, the user of system 100 may use a graphical user interface coupled to processor 110 to program certain power-saving requirements for system 100, such as sleep modes during periods of non-use or decreased use in which decreased access speeds or other reduced access requirements are likely. The user may specify when the system will be deemed in a high use mode with high performance requirements and when the system will be deemed in a power savings mode with overriding power saving requirements.

After check user specification step 220, storage control daemon 140 monitors the operation of system 100. As described above, certain operational characteristics of processor 110 may be monitored, such as the frequency of processor 110 and/or the power level of processor 110, and such as the job queue status.

Another type of operational characteristic which may be monitored during system operation monitoring step 230 is the utilization of processor 110. The operating system and applications executing in system 100 may be monitored during step 230 by storage control daemon 140 to determine the extent of utilization of the processing capability of processor 110 by such applications. For example, operating system (OS) 120 of processor 110 assigns time slices to various applications executing on processor 110, and operating system 120 keeps performance statistics based on the time slices. Storage control daemon 140 samples information regarding the extent to which each application utilizes its time slice, for example, by periodically querying the OS scheduler for such utilization information. For example, if many applications are not utilizing their full time slice, then processor 110 is being under-utilized. If processor 110 is being underutilized, then the performance of processor 110 may be ratcheted down, with a corresponding effect on future storage access requirements. Thus, such utilization information is useful in making storage device control decisions.

One way of measuring processor utilization is to sample the currently pending process list provided by file system 130. The processor run time used by each process since the last sampling may be calculated along with the actual elapsed time since the last sampling. The ratio of used process time to elapsed time yields one type of utilization metric.

Another type of operational characteristic is processor performance and/or performance history. The performance of processor 110 may be monitored by storage control daemon 140 during step 230. Performance can be measured using various processor characteristics. For example, the power supply voltage level is an indication of the performance of processor 110. Another indicator of processor performance is the frequency of processor 110. The voltage level and frequency may be varied together or independently at different times for power conservation purposes and for performance purposes. For example, during times where high performance is necessary, the frequency and power level may be increased, and during times where high performance is not necessary, the power level and frequency may be decreased to conserve power. Processor performance history may be monitored by continually or periodically measuring the performance of processor 110 and maintaining, for example, a running average of performance measurements (e.g., the last three measurements) to describe the recent history of the processor's power level and frequency.

The performance of processor 110 is typically closely related to storage access requirements. For example, when the frequency and/or power level of processor 110 are low, storage access requirements are likely to be low as well. Similarly, if processor 110 is being underutilized by applications, storage access requirements are likely to be low. Consequently, the current performance state and/or the recent performance history of processor 110, and patterns thereof, are relevant to efficient control of devices such as hard drive 160 and to making predictions regarding the anticipated storage access requirements for such devices.

After storage control daemon 140 begins monitoring the operational characteristics of system 100 during monitoring step 230, storage control daemon 140 predicts device access requirements during step 240. A predictive algorithm may be applied to the utilization and/or performance information during prediction step 240. For example, storage control daemon 140 may predict that device access requirements for hard drive 160 are decreasing as a result of decreased processor frequency and/or power level, which in turn typically results from decreased information processing requirements. Alternatively, storage control daemon 140 may predict that device access requirements for hard drive 160 are increasing as a result of increased processor frequency and/or power level, which in turn typically results from increased information processing requirements, which often lead to increased information storage access requirements.

Usage models can be generated to make predictions of processor operation based on the history of the operation of the processor. Thus, the history of the processor can be used to predict the future performance of the processor, and accordingly, to predict the future storage access requirements of the system and thereby prevent certain heat conditions from ever occurring. Predictive storage control and power conservation are particularly useful in mobile systems.

By analyzing the utilization and performance information in view of the predictive algorithm during prediction step 240, storage control information may be generated during control step 250. Storage control daemon 140 then controls certain device characteristics during device control step 250 based on the predictions made during prediction step 240. For example, if the job queue has few jobs and the jobs are small, or if the frequency of processor 110 is decreased, storage control daemon 140 observes the decrease during monitoring step 230 and then makes a prediction that hard drive access requirements will also decrease for hard drive 160 during prediction step 240. Control information is then generated to allow storage control daemon 140 or another application to take one or more actions depending on the operational observations made during monitoring step 230. These steps may be continually repeated for the duration of the operation of system 100.

Storage control daemon 140 can directly control the performance states of hard drive 160, for example, by selecting rotation speeds from a set of speeds previously provided by hard drive 160 during step 210. Storage control daemon 140 can also somewhat indirectly control hard drive 160 by sending control information such as percentage based operation parameters which can be interpreted by hard drive controller 170 to select specific rotation speeds.

Storage control daemon 140 can use rotational controller 172 to decrease the rotation of the rotational storage element 180, use seek controller 170 to decrease seek speeds of the read/write head of storage element 180, and even use local frequency controller 176 to reduce the operating frequency of hard drive controller 170, all in response to the predicted reduction in device access requirements. After control step 250, the system is again (or simultaneously) monitored during monitoring step 250.

Figure 3:
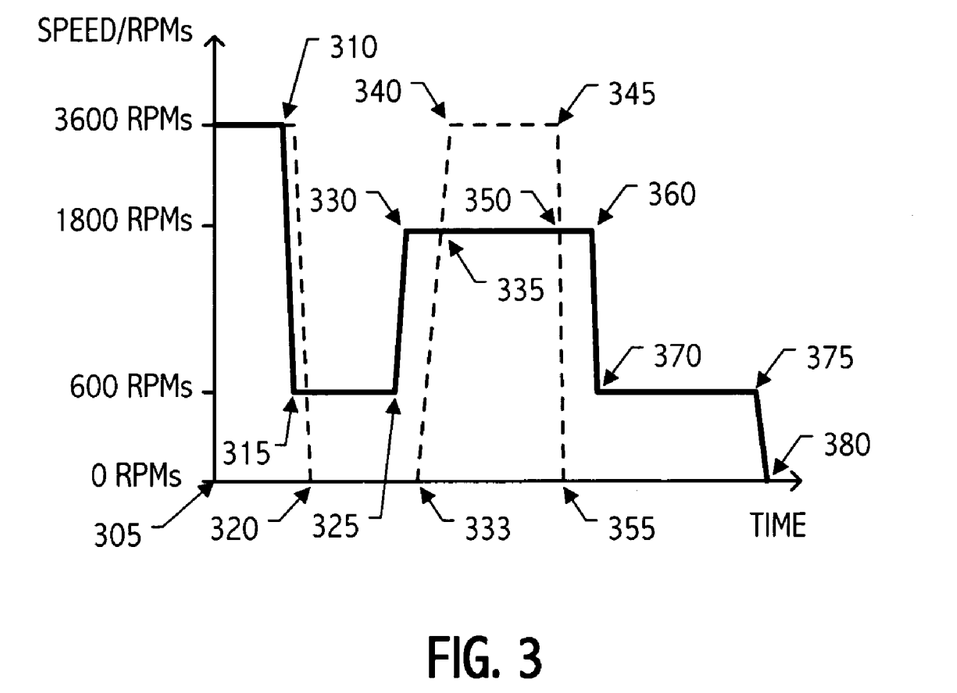
FIG. 3 is a timing diagram showing exemplary storage device operation.

FIG. 3 shows an example of operation of storage 180 under the control of storage control daemon 140. At time 305, the rotational storage element 180 is rotating at a speed of 3600 revolutions per minute (RPMs). This may be during a period of high speed information processing where a maximum speed of the rotational storage element is required. From time 305 to time 310, storage control daemon is monitoring the status of certain operational characteristics of system 100, and making predictions regarding storage access requirements.

By time 310, storage control daemon 140 has predicted reduced device access requirements for hard drive 160. Accordingly, storage control daemon 140 directs rotation controller 172 of hard drive controller 170 to in turn direct storage 180 to reduce the rotational speed from the maximum 3600 RPMs to an intermediate speed of 600 RPMs at time 315 as shown by the solid line. In contrast, another system might detect an absence of pending jobs at a time later than time 310, and induce the hard drive into a sleep state, as shown by the dotted line.

The speeds shown in FIG. 3 are exemplary; other speeds may be used and even a continuous speed range may be used. Speed may be selected based on power usage and/or noise generation. For example, a relatively inaudible speed may be selected when storage access requirements are anticipated to be low but non-negligible.

Storage 180 continues to rotate at a speed of 600 RPMs until time 325. During that time, storage control daemon 140 monitors the operation of system 100 (e.g., the operational characteristics of processor 110). There may be processor usage up-ticks during the time from time 315 to 325, but those temporary up-ticks may or may not be sufficient to trigger a higher storage access prediction which would trigger a higher speed. In another system, the up-ticks might induce the hard drive to increase to the maximum speed (not shown) for even small and low priority storage access requests.

At time 325, storage control daemon 140 has predicted increased device access requirements (e.g., due to increased frequency or processor usage). Accordingly, rotation controller 172 instructs storage 180 to increase its operational speed to a second intermediate speed of 1800 RPMs. Storage 180 achieves a rotational speed of 1800 RPMs at time 330. In another system, the storage might not increase its speed until an actual storage access is made at time 333, thereby inducing a maximum speed at time 340. Meanwhile, storage 180 is already ready to process storage accesses at time 335, and even at time 330, before time 340.

Storage 180 continues to operate at the intermediate speed of 1800 RPMs from time 330 to time 360. During this time, hardware control daemon 140 again monitors operational characteristics of system 100 and makes predictions. At time 360, hard drive controller 170 uses rotation controller 172 to decrease the operational speed of storage 180 in response to a predicted decrease in device access requirements. Accordingly, storage 180 reduces speed from 1800 RPMs to 600 RPMs from time 360 to time 370. Storage 180 then operates at 600 RPMs from time 370 to time 375.

At time 375, storage control daemon 140 has predicted further reduced device access requirements, and accordingly, directs storage 180 to essentially shut down by reducing rotational speed to 0 RPMs. This may be as a result of a sleep state of processor 110 during which no information needs to be processed and, therefore, no information from storage 180 needs to be accessed. This may also be a result of certain observed system characteristics meeting certain user defined requirements.

As shown, the foregoing operation of system 100 (shown with a solid line) is in contrast to control of other devices (shown with a dotted line) which may operate in one of two states: an operational, maximum speed state and a sleep, zero-speed state. Such a system may perceive a cessation in device access requests after time 310, and switch to a sleep state to await further device access requests. If such a request comes at time 325, then such a system would power the device to the maximum speed to process the request after time 325. The delay due to a lack of prediction of access requirements, coupled with the delay in powering up from such a low (here, zero) speed to a maximum operational value will delay the time at which processing of the request begins from a potential time of 330 when the device arrives at an intermediate speed using the process of FIG. 2 to a time of 340 after the device would arrives at a maximum speed. Although the access request may be processed more quickly at the maximum speed, the access request may be processed in a very reasonable time at an intermediate speed since the access request was being processed earlier at the intermediate speed. Greater power savings and reduced heat and noise are realized at the intermediate speed.

The above description is intended to describe at least one embodiment of the invention. The above description is not intended to define the scope of the invention. Rather, the scope of the invention is defined in the claims below. Thus, other embodiments of the invention include other variations, modifications, additions, and/or improvements to the above description.

In one embodiment, system 100 is a computer system such as a personal computer system, laptop or even a computer server system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, various wireless devices and embedded systems. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Those skilled in the art will recognize that boundaries between logic blocks are merely illustrative and that alternative embodiments may merge logic blocks or circuit elements or impose an alternate decomposition of functionality upon various logic blocks or circuit elements. Moreover, alternative embodiments may combine multiple instances of a particular component. For example, in the above-described embodiment, multiple processors may be used, and multiple storage devices may be used. Similarly, those skilled in the art will recognize that boundaries between the functionality of the steps and operations shown in FIG. 2 and described above are merely illustrative. The functionality of multiple operations may be combined into a single operation, and/or the functionality of single operations may be distributed in additional operations. Moreover, alternative embodiments may include multiple instances of a particular operation, and the order of operations may be altered and/or some operations may occur simultaneously in various other embodiments.

Unless specifically restricted, the operations discussed herein may consist of steps carried out by system users, hardware modules and/or software modules. Thus, the operations referred to herein may correspond to modules or portions of modules (e.g., software, firmware or hardware modules). For example, although the described embodiment includes software modules, the various exemplary modules may be application specific or general purpose hardware modules. The software modules discussed herein may include script, batch or other executable files, or combinations and/or portions of such files. The software modules may include a computer program or subroutines thereof encoded in computer-readable media. The functionality of operations referred to herein may correspond to the functionality of modules or portions of modules in various embodiments.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes. Moreover, alternative embodiments may combine multiple instances of a particular module or submodule.

Each of the blocks/operations of FIG. 2 may be executed by a module (e.g., a software module) or a portion of a module or a computer system user. Thus, the above described method, the operations thereof and modules therefor may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

The software modules described herein may be received by system 100, for example, from a computer readable media (e.g., storage 180 or another computer readable media). The computer readable media may be permanently, removably or remotely coupled to system 100. The computer readable storage media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; volatile storage media including registers, buffers or caches, main memory, RAM, etc. The data transmission media including computer networks, point-to-point telecommunication equipment, and carrier wave transmission media, just to name a few. Other new and various types of computer-readable media may be used to store and/or transmit the software modules discussed herein.

It is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

Because the above detailed description is exemplary, when "one embodiment" is described, it is an exemplary embodiment. Accordingly, the use of the word "one" in this context is not intended to indicate that one and only one embodiment may have a described feature. Rather, many other embodiments may, and often do, have the described feature of the exemplary "one embodiment." Thus, as used above, when the invention is described in the context of one embodiment, that one embodiment is one of many possible embodiments of the invention.

Notwithstanding the above caveat regarding the use of the words "one embodiment" in the detailed description, it will be understood by those within the art that if a specific number of an introduced claim element is intended in the below claims, such an intent will be explicitly recited in the claim, and in the absence of such recitation no such limitation is present or intended. For example, in the claims below, when a claim element is described as having "one" feature, it is intended that the element be limited to one and only one of the feature described. Furthermore, when a claim element is described in the claims below as including or comprising "a" feature, it is not intended that the element be limited to one and only one of the feature described. Rather, for example, the claim including "a" feature reads upon an apparatus or method including one or more of the feature in question. That is, because the apparatus or method in question includes a feature, the claim reads on the apparatus or method regardless of whether the apparatus or method includes another such similar feature. This use of the word "a" as a nonlimiting, introductory article to a feature of a claim is adopted herein by Applicants as being identical to the interpretation adopted by many courts in the past, notwithstanding any anomalous or precedential case law to the contrary that may be found. Similarly, when a claim element is described in the claims below as including or comprising an aforementioned feature (e.g., "the" feature), it is intended that the element not be limited to one and only one of the feature described merely by the incidental use of the definite article.

Furthermore, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

While particular embodiments of the present invention have been shown and described, it will be obvious to those skilled in the art that, based upon the teachings herein, various modifications, alternative constructions, and equivalents may be used without departing from the invention claimed herein. Consequently, the appended claims encompass within their scope all such changes, modifications, etc. as are within the true spirit and scope of the invention. Furthermore, it is to be understood that the invention is solely defined by the appended claims. The above description is not intended to present an exhaustive list of embodiments of the invention. Unless expressly stated otherwise, each example presented herein is a nonlimiting or nonexclusive example, whether or not the terms nonlimiting, nonexclusive or similar terms are contemporaneously expressed with each example. Although an attempt has been made to outline some exemplary embodiments and exemplary variations thereto, other embodiments and/or variations are within the scope of the invention as defined in the claims below.

What is claimed is:

1. A method of operating a storage device which is coupled to an information processing system, the method comprising:
    monitoring one or more operational characteristics of the information processing system;
    predicting a device access requirement dependent at least in part upon the one or more monitored operational characteristics of the information processing system; and
    controlling a controllable characteristic of the storage device in a manner dependent at least in part on an operational characteristic of the information processing system, wherein the controlling includes controlling at least one controllable characteristic of the storage device in a manner dependent at least in part on the predicted device access requirement,
    wherein the controllable characteristic is controllable to any one of a plurality of operational modes that includes at least one intermediate operational mode,
    wherein the controlling the controllable characteristics includes changing a clock signal frequency of the storage device, changing a power level of the storage device, changing a relative speed between a movable computer readable medium and a data transfer element of the storage device, changing a seek speed of a data read/write head responsive to a change in the operational characteristic, changing a detection threshold of a data read/write head of the storage device responsive to a change in the operational characteristic, changing data transfer timing of a read/write head of the storage device responsive to a change in the operational characteristic, or changing circuit filter values of a data detection circuit of the storage device responsive to a change in the operational characteristic.

2. The method of claim 1 wherein the operational characteristics include job queue status of the information processing system, pending storage access jobs, size of the pending storage access jobs operating frequency of the information processing system, power level of the information processing system, or time usage of a processor by processes executing in the information processing system.

3. The method of claim 1 further comprising:
    determining the controllable characteristic of the storage device; and
    configuring a storage control daemon of the information processing system to control the determined characteristic.

4. The method of claim 1 further comprising:
    determining whether the controllable characteristic of the storage device is described in a set of user defined requirements; and wherein
    controlling includes controlling the controllable characteristic of the storage device in a manner dependent at least in part on one or more user defined requirements.

5. The method of claim 1 further comprising:
operating the storage device in one of the plurality of operational modes, each of the operational modes including at least one requirement of at least one controllable characteristic, each operational mode being selected at least in part by the operational characteristic of the information processing system.

6. The method of claim 5 further comprising:
applying different speed requirements to a movable element in each operational mode, wherein the storage device includes the movable element, wherein one of the at least one controllable characteristics is a variable speed of the movable element.

7. The method of claim 6 wherein the applying different speed requirements comprises:
operating the storage device in a power down mode in which the movable element has a rotational speed equal to a first speed;
operating the storage device in a power saving access mode in which the movable element has a rotational speed equal to a second speed greater than the first speed; and
operating the storage device in a high access mode in which the movable element has a rotational speed equal to a third speed greater than the second speed.

8. The method of claim 7 wherein
the first speed is substantially equal to zero revolutions per minute; and
the third speed is substantially equal to a maximum rotational speed of a rotating element.

9. An information processing system comprising:
a processing platform;
a storage controller coupled to receive information regarding an operational characteristic of the processing platform after execution of the storage controller is initiated, the storage controller to monitor the received information to predict storage access requirements, and to generate control information based, at least in part, on predicted storage access requirements;
a storage platform coupled to the processing platform and coupled to receive the control information from the storage controller after execution of the storage controller is initiated,
wherein the control information from the storage controller indicates one of a plurality of operational modes for one or more elements of the storage platform,
wherein the elements of the storage platform include at least one of clock signal frequency of the storage platform, power level of the storage platform, a data read/write head, and circuit filter values,
wherein the plurality of operational modes includes an intermediate operational state.

10. The information processing system of claim 9 wherein
the processing platform includes the storage controller; and
the storage platform includes a storage platform controller, the storage platform controller being configurable to control one or more controllable characteristics of the storage platform responsive to receiving the control information from the storage controller.

11. The information processing system of claim 10 wherein the storage platform further comprises at least one controller comprising:
a computer readable medium speed controller; and
a computer readable medium access element controller.

12. The information processing system of claim 10 wherein
the storage platform is a disk drive and the computer readable medium is a disk; and
the computer readable medium speed controller is configured to control the rotational speed of the disk responsive to receiving the control information from the monitoring daemon.

13. The information processing system of claim 10 wherein
the storage platform is a disk drive;
the computer readable medium access element is a read/write head of the disk drive; and
the computer readable medium access element controller controls the seek rate of the computer readable access element.

14. The information processing system of claim 10 wherein the storage platform further comprises:
a local processor; and
a local processor controller, the local processor controller being configurable to control a power characteristic of the local processor.

15. The information processing system of claim 14 wherein the power characteristic includes at least one of a frequency of a clock of the local processor and a power level of the local processor.

16. The information processing system of claim 9 wherein the operational characteristic includes a pending storage access job queue status or a storage access requirement prediction metric dependent at least in part on a number of pending storage access jobs and a size of each pending storage access job.

17. A method comprising:
observing one or more operational characteristics of an information processing platform;
predicting access requirements of a storage device based, at least in part, on the observed operational characteristics; and
controlling operation of the storage device in accordance with the predicted access requirements,
wherein the controlling operation of the storage device comprises controlling the storage device to operate at any of a plurality of operational modes that at least include a sleep mode, a low-use mode, and a high use mode.

18. The method of claim 17, wherein the controlling operation of the storage device includes controlling rotational speed, controlling seek speed, controlling settle speed, controlling frequency of a processor local to the storage device, and controlling power of a processor local to the storage device.

19. The method of claim 18 further comprising averaging those of the stored observed operational characteristics within a given time period.

20. The method of claim 17, wherein the operational characteristics include at least one of processor frequency, processor voltage, current pending requests to the storage device, job backlog for the storage device, age of the job backlog, and size of the job backlog.

21. An apparatus comprising:
memory;
means for controlling operational characteristics of a storage device to operate at any of a plurality of active operational modes in accordance with observed characteristics of a system coupled with the storage device;
means for determining the operational characteristics of the storage device; and
means for predicting access requirements of the storage device based, at least in part, on the observed characteristics of the system.

22. The apparatus of claim 21 wherein the apparatus is a computer system further comprising a processor.

23. A system comprising:
a storage device; and
a processor coupled with the storage device, the processor operable to monitor one or more operational characteristics of the system and dynamically adjust operation of the storage device among a plurality of operational modes based, at least in part, on the monitored operational characteristics,
wherein the plurality of operational modes includes at least one intermediate operational mode,
wherein the plurality of operational modes at least includes a sleep mode, a low-use mode, and a high-use mode; and the processor operable to predict access requirements of the storage device based, at least in part, on the monitored operational characteristics.

24. The system of claim 23, wherein the storage device includes a magneto storage device, an optical storage device, or a magneto-optical storage device.

25. The system of claim 23, wherein the dynamically adjust operation includes at least one of adjusting rotational speed of the storage device, adjusting seek speed of the storage device, adjusting settle speed of the storage device, adjusting frequency of a processor local to the storage device, and adjusting power of a processor local to the storage device.

26. A computer program product encoded on one or more machine-readable storage media, the computer program product comprising:
a sequence of instructions executable to,
query a storage device to determine at least one controllable characteristic of the storage device,
monitor one or more operational characteristics of a system that is coupled with the storage device,
vary, among a plurality of operational levels, the at least one controllable characteristic of the storage device based, at least in part, on monitored operational characteristics,
wherein the plurality of operational levels includes at least one intermediate operational level; and the sequence of instructions executable to predict access requirements of the storage device based, at least in part, on operational characteristics of the system.

27. The computer program product of claim 26 further comprising the sequence of instructions executable to store monitored operational characteristics.

28. The computer program product of claim 26 further comprising the sequence of instructions executable to determine the controllable characteristic.

29. The computer program product of claim 26, wherein the plurality of operational levels includes a sleep mode, low power mode, and high performance mode.

30. The computer program product of claim 26, wherein the controllable characteristic includes rotational speed, seek speed, settle speed, voltage of a processor local to the storage device, or frequency of a processor local to the storage device.

31. The computer program product of claim 26, wherein the operational characteristics of the system include at least one of power level, clock frequency, processor utilization, operating system time slice utilization, job queue size, job queue age, job queue status.

32. A method comprising:
determining at least one criteria for each of a plurality of operational modes, which includes an intermediate operational mode, of a storage device, wherein the criteria are based, at least in part, on operational characteristics of a system;
monitoring the system operational characteristics to observe the criteria; and
controlling the storage device to operate at ones of the plurality of operational modes based, at least in part, on observance of system operational characteristic criteria corresponding to the ones of the plurality of operational modes,
wherein monitoring the operational characteristic of the system comprises at least one of monitoring utilization of a processor by applications executing at least in part on the processor of the system, monitoring at least one clock frequency of the processor, and monitoring at least one power level of the processor; and predicting access requirements of the storage device based on observed system operational characteristic criteria, and controlling the storage device in accordance with the predicting access requirements.

33. The method of claim 32 further comprising querying the storage device to determine the plurality of operational modes.

34. The method of claim 32, wherein the operational characteristics include at least one of historical operational characteristics and non-historical operational characteristics.

35. The method of claim 32, wherein the correspondence between the criteria and the plurality of operational modes is defined by at least one of a user and configuration information.

36. The method of claim 32 embodied as a computer program product encoded on one or more computer-readable media.

37. The method of claim 32 further comprising:
generating storage device control information depending on the operational characteristics.

38. The method of claim 37 wherein the controlling the storage device comprises controlling a hard drive to operate at a speed determined at least in part by the storage control information.

39. The method of claim 37 wherein the controlling the storage device comprises controlling a local processor in the storage device to operate in a power conservation mode responsive to the storage control information.

40. The method of claim 39 wherein the controlling the local processor comprises at least one:
changing a frequency of at least one clock of the local processor responsive to receiving the storage control information; and
changing a power supply level of the local processor responsive to receiving the storage control information.

41. The method of claim 32 wherein monitoring the utilization of the processor comprises at least one of:
monitoring an extent of time slice usage by the applications; and
monitoring a task queue established by an operating system of the processor.

42. The method of claim 32 wherein monitoring the operational characteristic of the system comprises:
periodically measuring a clock frequency of processor of the information processing system; and
generating a running average of past clock frequency measurements to provide the operational characteristic.

43. The method of claim 32 wherein monitoring the operational characteristic of the system comprises:
periodically measuring a power level of a processor of the information processing system; and
generating a running average of past power level measurements to provide the operational characteristic.

* * * * *